United States Patent [19]

Kawashima

[11] Patent Number: 5,416,745

[45] Date of Patent: May 16, 1995

[54] PARALLEL DATA TRANSFER CIRCUIT

[75] Inventor: Takaaki Kawashima, Tokyo, Japan

[73] Assignee: NEC Corporation, Tokyo, Japan

[21] Appl. No.: 200,504

[22] Filed: Feb. 23, 1994

[30] Foreign Application Priority Data

Feb. 26, 1993 [JP] Japan .................................. 5-038530

[51] Int. Cl.$^6$ ................................................ G11C 7/00
[52] U.S. Cl. ...................................... 365/220; 365/78;
365/189.12
[58] Field of Search ...................... 365/78, 189.12, 240,
365/220, 221, 219

[56] References Cited

U.S. PATENT DOCUMENTS 5,257,237 10/1993 Aranda ...................... 365/189.12 X
5,282,164 1/1994 Kawana ........................... 365/189.12

FOREIGN PATENT DOCUMENTS 62-32748 2/1987 Japan .
62-49735 3/1987 Japan .
1-238338 9/1989 Japan .

Primary Examiner—Joseph A. Popek
Assistant Examiner—Son Mai
Attorney, Agent, or Firm—Popham, Haik, Schnobrich & Kaufman, Ltd.

[57] ABSTRACT

A parallel data transfer circuit wherein processing at a data transfer source circuit is simplified to reduce the time required for transfer and a data storage area of a data transfer destination circuit can be used effectively is disclosed. A plurality of data register sets for temporarily latching parallel data and a plurality of corresponding flag register sets are provided between a data transfer source circuit and a data transfer destination circuit. A register designation signal is outputted from the data transfer source circuit to designate a data register into which data should be written. Only when data should be written into the data register, a flag is placed into a corresponding flag register. Since the data transfer destination circuit fetches data only from those data registers corresponding to those flag registers in which a flag is held, parallel data can be received without forming a discontinuous empty portion in data storage area of the data transfer destination circuit.

3 Claims, 2 Drawing Sheets

PARALLEL DATA TRANSFER CIRCUIT

BACKGROUND OF THE INVENTION

1. Field of the Invention

This invention relates to a parallel data transfer circuit which transfers parallel data from a transfer source circuit to a transfer destination circuit in a digital communication apparatus or a like apparatus.

2. Description of the Related Art

Various parallel data transfer circuits are conventionally known, and an exemplary one of conventional parallel data transfer circuits is shown in FIG. 2. Referring to FIG. 2, in the parallel data transfer circuit shown, parallel data are transferred from a data transfer source circuit 201 to a data transfer destination circuit 202. In order to allow the data transfer source circuit 201 to perform data storage address control of the data transfer destination circuit 202, an address signal 211, an upper byte write signal 212 and a lower byte write signal 213 are sent from the data transfer source circuit 201 to the data transfer destination circuit 202 before parallel data are transferred from the data transfer source circuit 201 to the data transfer destination circuit 202. For transfer of parallel data which include word data of 16 bits and byte data of 8 bits in a mixed condition, it is necessary to prepare a data bus of a word width and provide a change-over circuit such as an upper byte data selector 203 and a lower byte data selector 204 between the data transfer source circuit 201 and the data transfer destination circuit 202 so that an upper byte and a lower byte of the parallel data may be selected. Such changing over is controlled by the data transfer source circuit 201 (refer to, for example, Japanese Patent Laid-Open Application No. Showa 62-32748, No. Showa 62-49735 or No. Heisei 1-238338).

The parallel data transfer circuit further includes a data bus 214 for 8 bits between the data transfer source circuit 201 and the upper byte data selector 203, another data bus 215 between the data transfer source circuit 201 and the lower byte data selector 204, an upper byte data select signal line 216, a lower byte data select signal line 217, a further data bus 218 for 8 bits between the upper byte data selector 203 and the data transfer destination circuit 202, and a still further data bus 219 between the lower byte data selector 204 and the data transfer destination circuit 202.

The conventional parallel data transfer circuit described above is disadvantageous in that processing at the data transfer source circuit 201 is complicated and much time is required for transfer since the data transfer source circuit 201 performs changing over between the upper byte data selector 203 and the lower byte data selector 204 and controls the data storage address of the data transfer destination circuit 202 to transfer data.

Further, the conventional parallel data transfer circuit is also disadvantageous in that, when data are transferred without involving such changing over between data buses, a discontinuous empty portion is produced in the data storage area of the data transfer destination circuit 202 and consequently the data storage area cannot be used effectively.

SUMMARY OF THE INVENTION

It is an object of the present invention to provide a parallel data transfer circuit wherein processing at a data transfer source circuit is simplified to reduce the time required for transfer.

It is another object of the present invention to provide a parallel data transfer circuit wherein formation of a discontinuous empty portion in a data storage area of a data transfer destination circuit is prevented to allow effective use of the data storage area.

In order to attain the objects described above, according to the present invention, there is provided a parallel data transfer circuit, which comprises a data transfer source circuit for outputting a register designation signal together with parallel data, a plurality of data registers, a plurality of flag registers individually corresponding to the data registers, a write circuit for writing parallel data outputted from the data transfer source circuit into one of the data registers designated by the register designation signal from the data transfer source circuit and placing a flag into one of the flag registers corresponding to the data register, a read circuit for reading data in the data registers and a flag in the flag registers, and a data transfer destination circuit for outputting, after an end signal is received from the data transfer source circuit, a select signal to select one of the data registers and one of the flag registers to read out data in the data register and a flag in the flag register by way of the read circuit and fetching the data read out by the read circuit when no flag is held by the flag register corresponding to the data register selected in response to the select signal but refraining from fetching the data when a flag is not held by the flag register.

In a preferred form of the present invention, the write circuit includes a decoder for decoding the register designation signal from the data transfer source circuit, and a plurality of OR circuits provided for the plurality of data registers and the plurality of flag registers for receiving a signal decoded by the decoder and the write signal outputted from the data transfer source circuit to put a corresponding one of the data registers into a writing condition and place a flag into a corresponding one of the flag registers, and the read circuit includes a data selector for selecting one of the data selectors in response to the select signal from the data transfer destination circuit and a flag selector for selecting one of the flag registers in response to the select signal.

The plurality of data registers may include a plurality of sets of data registers for an upper byte and a lower byte. The plurality of flag registers include a plurality of sets of flag registers for an upper byte and a lower byte.

With the parallel data transfer circuit, when data outputted from the data transfer source circuit are written into one of the data registers designated by a register designation signal, a flag is placed into one of the flag registers corresponding to the data register, but no flag is placed into a register corresponding to one of the data registers into which no data are written. Thus, data only of data registers corresponding to those of the flag registers in which a flag is held are fetched into the data transfer destination circuit, and consequently, the parallel data can be received without forming a discontinuous empty portion in the data storage area of the data transfer destination circuit.

Further, the data transfer source circuit does not output a signal for controlling the data storage address of the data transfer destination circuit but only outputs, simultaneously with data, a resister designation signal for designating those of the data registers and the flag registers which should temporarily latch data between the data transfer source circuit and the data transfer destination circuit, that is, a sequence signal for successively selecting the registers. Consequently, since the data transfer source circuit does not control the data storage address of the data transfer destination circuit at all, processing to be executed by the data transfer source circuit is reduced and the time required for transfer for data is reduced as much.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENT

Figure 1:
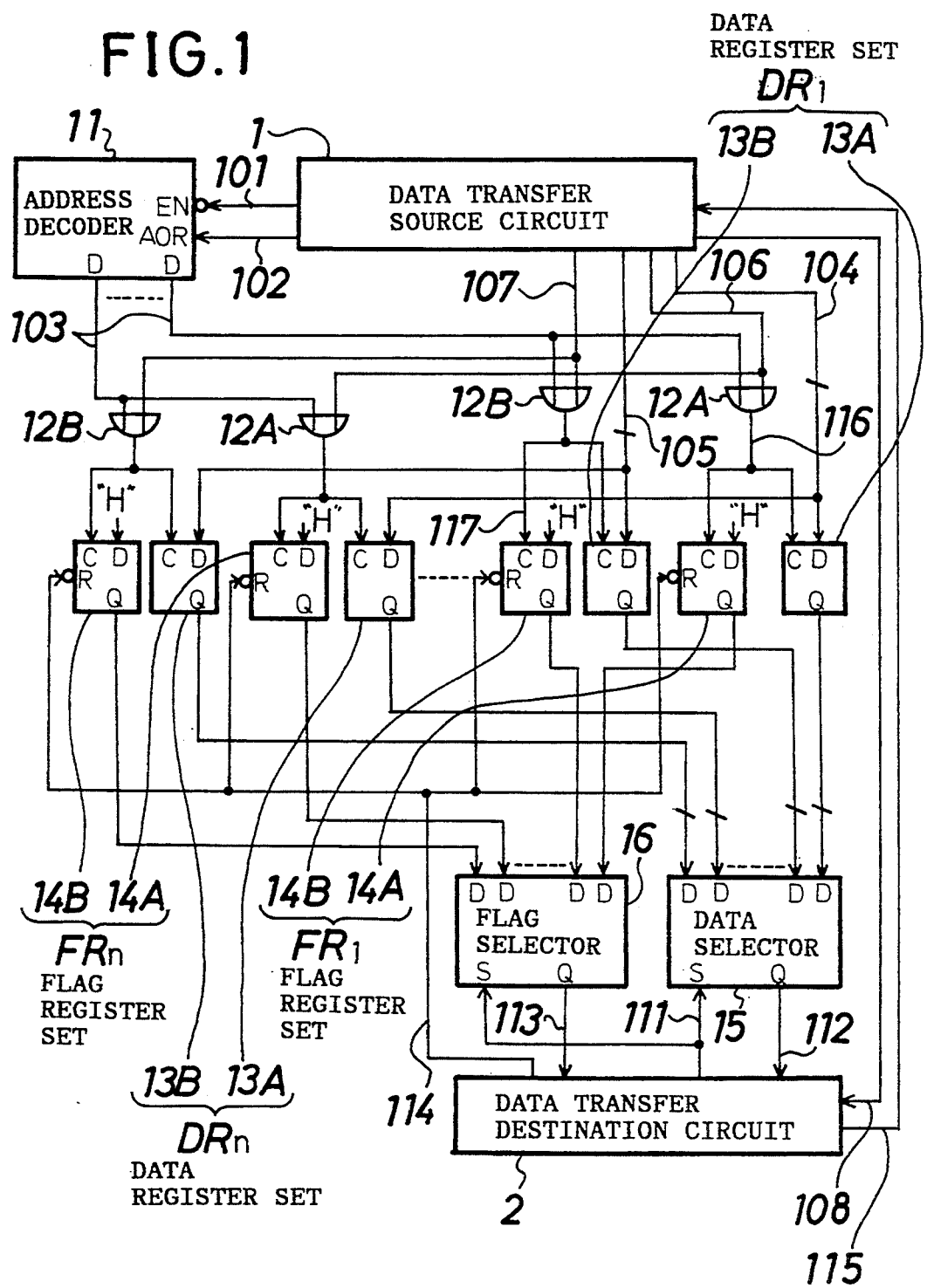
FIG. 1 is a block diagram of a parallel data transfer circuit showing a preferred embodiment of the present invention.
Figure 2:
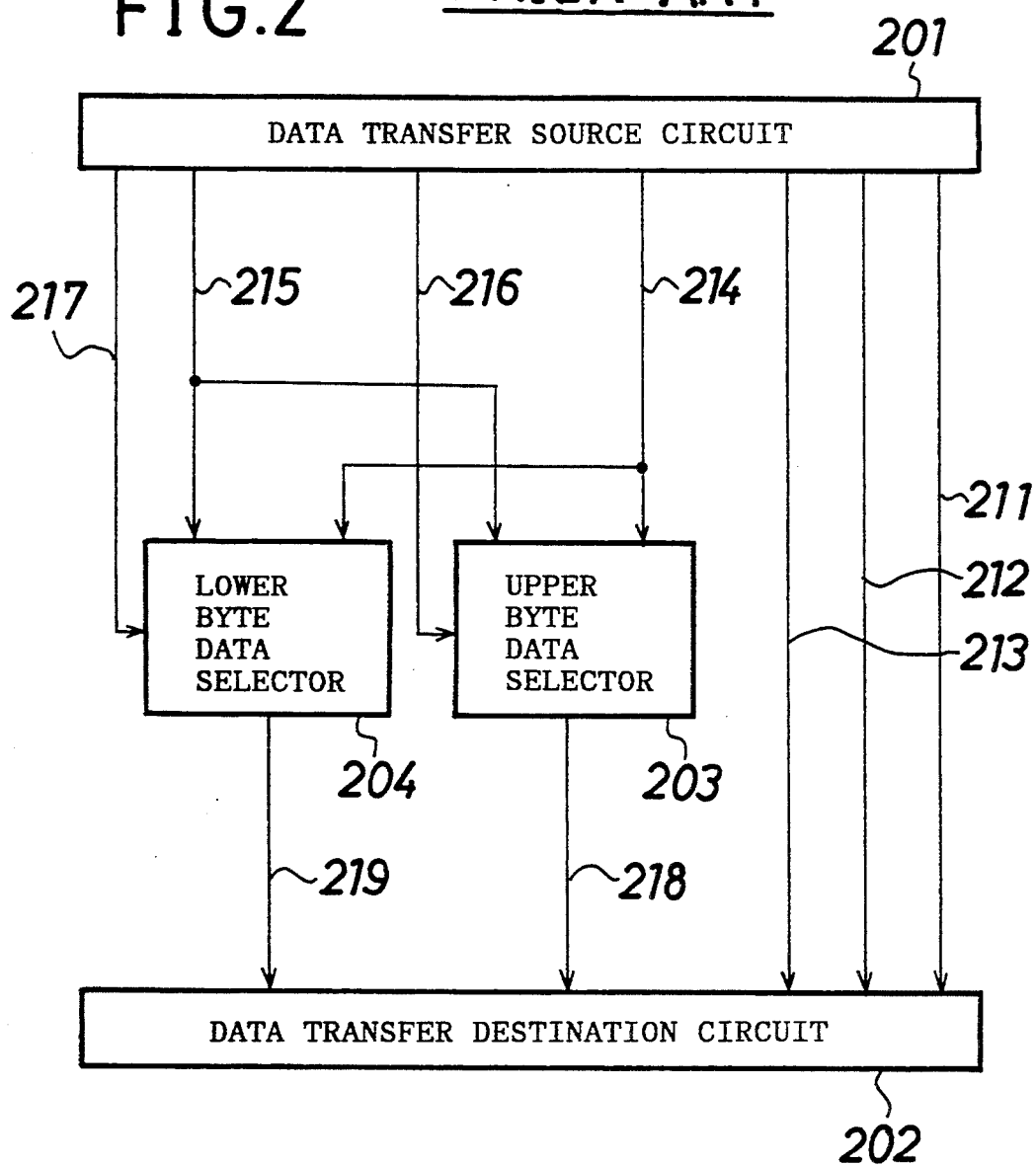
FIG. 2 is a block diagram showing an outline of a conventional parallel data transfer circuit.

Referring to FIG. 1, there is shown a parallel data transfer circuit to which the present invention is applied. The parallel data transfer circuit shown includes a data transfer source circuit 1, a data transfer destination circuit 2, a decoder 11, n data register sets DR1 to DRn each composed of a pair of registers 13A and 13B for an upper byte and a lower byte, respectively, n corresponding flag register sets FR1 to FRn each composed of a pair of registers 14A and 14B for an upper byte and a lower byte corresponding to the registers 13A and 13B for an upper byte and a lower byte of each set, respectively, a pair of OR circuits 12A and 13B for an upper byte and a lower byte corresponding to the registers 13A and 14A for an upper byte and the registers 13B and 14B for a lower byte of each set, respectively, a data selector 15, and a flag selector 16.

In the parallel data transfer circuit, the decoder 11 and the n OR circuits 12A and n OR circuits 12B constitute a write circuit for writing data and a flag, and the data selector 15 and the flag selector 16 constitute a read circuit for reading out data and a flag. Here, the parallel data transfer circuit can transfer three kinds of data including data composed only of an upper byte, data composed only of a lower byte, and word data, and can transfer n words in the maximum in a single transferring operation.

It is to be noted that, while several signal lines interconnecting the components of the parallel data transfer circuit described above are shown in FIG. 1, each line with a slating line attached thereto represents that the signal line is actually parallel signal lines for 8 bits.

When data are to be transferred, the data transfer source circuit 1 outputs a decoder enable signal 101 to put the decoder 11 into an enabled condition and then outputs to the decoder 11 a register designation signal 102 which successively designates required ones of the n data registers and flag registers. Further, when upper byte data 104 and/or lower byte data 105 are to be outputted, the data transfer source circuit 1 simultaneously outputs an upper byte write instruction signal 106 and/or a lower byte write instruction signal 107. Then, after outputting of data for a single transferring cycle (a set of data) is completed, the data transfer source circuit 1 outputs a transmission end signal 108 to the data transfer destination circuit 2.

The decoder 11 decodes the register designation signal 102 from the data transfer source circuit 1 and inputs a write permission signal 103 to the OR circuits 12A and 12B for an upper byte and a lower byte of the set designated by the register designation signal 102. In the set to which the write permission signal 103 is inputted, if an upper byte write instruction signal 106 is outputted simultaneously from the data transfer source circuit 1, a write signal 116 is outputted from the OR circuit 12A for an upper byte to write upper byte data 104 from the data transfer source circuit 1 into the data register 13A for an upper byte and place a flag into the flag register 14A for an upper byte. On the other hand, if a lower byte write instruction signal 107 is outputted simultaneously from the data transfer source circuit 1, a write signal 117 is outputted from the OR circuit 12B for a lower byte to write lower byte data 105 from the data transfer source circuit 1 into the data register 13B for a lower byte and place a flag into the flag register 14B for a lower byte.

When a transmission end signal 108 is received from the data transfer source circuit 1, the data transfer destination circuit 2 outputs a select signal 111 to the data selector 15 and the flag selector 16. In response to the select signal 111, the data selector successively selects the n data register sets DR1 to DRn for each of the registers 14A and 14B to read out data and outputs the data as read data 112 to the data transfer destination circuit 2. Meanwhile, the flag selector 16 successively selects, in response to the select signal 111, the n flag register sets FR1 to FRn for each of the registers 14A and 14B to read out a flag and outputs the flag as a flag read signal 113 to the data transfer destination circuit 2.

The data transfer destination circuit 2 fetches the read data 112 from the data selector 15, that is, data read out from the data register selected in response to the select signal 111, when the flag read signal 113 from the flag selector 16 is "flag present" representing presence of a flag, that is, when a flag is held in the flag register selected in response to the select signal 111. On the contrary when the flag read signal 113 is "flag absent" representing absence of a flag, that is, when no flag is held in the flag register selected in response to the select signal 111, the data transfer destination circuit 2 refrains from fetching the data from the data register selected in response to the select signal 111. In other words, the data transfer destination circuit 2 fetches data only from the register 13A or 13B corresponding to the register 14A or 14B in which a flag is held. Accordingly, no discontinuous empty portion is produced in the data storage area of the data transfer destination circuit 2.

After the data fetching operation from all of the register sets DR1 to DRn is completed, the data transfer source circuit 2 outputs a reception end signal 115 to the data transfer source circuit 1 and outputs a reset signal 114 to the registers 14A and 14B of all of the flag register sets FR1 to FRn.

Subsequently, an operation for writing only upper byte data, another operation for writing only lower byte data and a further operation for writing word data into a data register will be described.

<Writing Only of Upper Byte Data>

1. A decoder enable signal 101 is outputted from the data transfer source circuit 1 to put the decoder 11 into an enabled condition.

2. A register designation signal 102 which designates, for example, a first register set is outputted from the decoder transfer source circuit 1 to the decoder 11.

3. A write permission signal 103 for the first set is outputted from the decoder 11, and an upper byte write instruction signal 106 is outputted from the data transfer source circuit 1.

4. A write signal 116 is outputted from the 0R circuit 12A for an upper byte of the first set to put the register 13A for an upper byte of the first register set DR1 and the register 14A for an upper byte of the first flag register set FR1 into a write enabled condition.

5. Upper byte data 104 are outputted from the data transfer source circuit 1 and latched by the register 13A for an upper byte of the first data register set DR1, and a flag is placed into the register 14A for an upper byte of the first flag register set FR1.

<Writing Only of Lower Byte Data>

1. A decoder enable signal 101 is outputted from the data transfer source circuit 1 to put the decoder 11 into an enabled condition.

2. A register designation signal 102 which designates, for example, a second register set is outputted from the decoder transfer source circuit 1 to the decoder 11.

3. A write permission signal 103 for the second set is outputted from the decoder 11, and an upper byte write instruction signal 106 is outputted from the data transfer source circuit 1.

4. A write signal 117 is outputted from the 0R circuit 12B for a lower byte of the second set to put the register 13B for a lower byte of the second register set DR2 and the register 14B for a lower byte of the second flag register set FR2 into a write enabled condition.

5. Lower byte data 105 are outputted from the data transfer source circuit 1 and latched by the register 13B for a lower byte of the second data register set DR2, and a flag is placed into the register 14B for a lower byte of the second flag register set FR2.

<Writing of Word Data>

1. A decoder enable signal 101 is outputted from the data transfer source circuit 1 to put the decoder 11 into an enabled condition.

2. A register designation signal 102 which designates, for example, a third register set is outputted from the decoder transfer source circuit 1 to the decoder 11.

3. A write permission signal 103 for the third set is outputted from the decoder 11, and an upper byte write instruction signal 106 and a lower byte write instruction signal 107 are outputted from the data transfer source circuit 1.

4. Write signal 116 and 117 are outputted from the OR circuit 12A for an upper byte and the OR circuit 12B for a lower byte of the third set to put the register 13A for an upper byte and the register 13B for a lower byte of the third register set DR3 and the register 14A for an upper byte and the register 14B for a lower byte of the third flag register set FR3 into a write enabled condition, respectively.

5. Upper byte data 104 are outputted from the data transfer source circuit 1 and latched by the register 13A for an upper byte of the third data register set DR3 and lower byte data 105 are latched by the register 13B for a lower byte of the third data register set DR3, and a flag is placed into each of the the register 14A for an upper byte and the register 14B for a lower byte of the third flag register set FR3.

Subsequently, a reading operation for the data registers will be described by way of an example wherein only upper byte data are latched in the first data register set DR1 and only lower byte data are latched in the second data register set DR2 while word data are latched in the third data register set DR2 as a result of the writing operation described above.

1. The data transfer destination circuit 2 first outputs, to the data selector 15 and the flag selector 16, a select signal 111 to select the register 13A for an upper byte of the first data register set DR1 and the register 14A for an upper byte of the first flag register set FR1.

2. The data selector 15 reads out data of the register 13A for an upper byte of the first data register set DR1 and outputs the read data 112 while the flag selector 16 reads out a flag of the register 14A for an upper byte of the first flag register set FR1 and outputs a flag read signal 113 of "flag present".

3. The data transfer destination circuit 2 fetches the read data 112 from the data selector 15 since the flag read signal 113 is "flag present".

4. Then, the data transfer destination circuit 2 outputs a select signal 111 to select the register 13B for a lower byte of the first data register set DR1 and the register 14B for a lower byte of the first flag register set FR1.

5. The data register 15 reads out data of the register 14B for a lower byte of the first data register set DR1 and outputs the read data 112 while the flag selector 16 reads out a flag of the register 14B for a lower byte of the first flag register set FR1 and outputs a flag read signal 113 of "flag absent".

6. The data transfer destination circuit 2 refrains from fetching the read data 112 since the flag read signal 113 is "flag absent".

7. Subsequently, the data transfer destination circuit 2 outputs a select signal 111 to select the register 13A for an upper byte of the second data register set DR2 and the register 14A for an upper byte of the second flag register set FR2.

8. The data selector 15 reads out data of the register 13A for an upper byte of the second data register set DR2 and outputs the read data 112 while the flag selector 16 reads out a flag of the register 14A for an upper byte of the second flag register set FR2 and outputs a flag read signal 113 of "flag absent".

9. The data transfer destination circuit 2 refrains from fetching the read data 112 since the flag read signal 113 is "flag absent".

10. Then, the data transfer destination circuit 2 outputs a select signal 111 to select the register 13B for a lower byte of the second data register set DR2 and the register 14B for a lower byte of the second flag register set FR2.

11. The data selector 15 reads out data of the register 13B for a lower byte of the second data register set DR2 and outputs the read data 112 while the flag selector 16 reads out a flag of the register 14B for a lower byte of the second flag register set FR2 and outputs a flag read signal 113 of "flag present".

12. The data transfer destination circuit 2 fetches the read data 112 since the flag read signal 113 is "flag present".

13. Then, the data transfer destination circuit 2 outputs a select signal 111 to select the register 13A for an upper byte of the third data register set DR3 and the register 14A for an upper byte of the third flag register set FR3.

14. The data selector 15 reads out data of the register 13A for an upper byte of the third data register set DR3 and outputs the read data 112 while the flag selector 16 reads out a flag of the register 14A for an upper byte of the third flag register set FR3 and outputs a flag read signal 113 of "flag absent".

15. The data transfer destination circuit 2 refrains from fetching the read data 112 since the flag read signal 113 is "flag absent".

16. Subsequently, the data transfer destination circuit 2 outputs a select signal 111 to select the register 13B for a lower byte of the third data register set DR3 and the register 14B for a lower byte of the third flag register set FR3.

17. The data selector 15 reads out data of the register 13B for a lower byte of the third data register set DR3 and outputs the read data 112 while the flag selector 16 reads out a flag of the register 14B for a lower byte of the third flag register set FR3 and outputs a flag read signal 113 of "flag present".

18. The data transfer destination circuit 2 fetches the read data 112 since the flag read signal 113 is "flag present".

Having now fully described the invention, it will be apparent to one of ordinary skill in the art that many changes and modifications can be made thereto without departing from the spirit and scope of the invention as set forth herein.

What is claimed is:

1. A parallel data transfer circuit, comprising:
   a data transfer source circuit for outputting a register designation signal together with parallel data;
   a plurality of data registers;
   a plurality of flag registers individually corresponding to said data registers;
   a write circuit for writing parallel data outputted from said data transfer source circuit into one of said data registers designated by the register designation signal from said data transfer source circuit and placing a flag into one of said flag registers corresponding to the data register;
   a read circuit for reading data in said data registers and a flag in said flag registers; and
   a data transfer destination circuit for outputting, after an end signal is received from said data transfer source circuit, a select signal to select one of said data registers and one of said flag registers to read out data in the data register and a flag in the flag register by way of said read circuit and fetching the data read out by said read circuit when no flag is held by the flag register corresponding to the data register selected in response to the select signal but refraining from fetching the data when a flag is not held by the flag register.

2. A parallel data transfer circuit as claimed in claim 1, wherein said write circuit includes a decoder for decoding the register designation signal from said data transfer source circuit, and a plurality of OR circuits provided for said plurality of data registers and said plurality of flag registers for receiving a signal decoded by said decoder and the write signal outputted from said data transfer source circuit to put a corresponding one of said data registers into a writing condition and place a flag into a corresponding one of said flag registers, and said read circuit includes a data selector for selecting one of said data registers in response to the select signal from said data transfer destination circuit and a flag selector for selecting one of said flag registers in response to the select signal.

3. A parallel data transfer circuit as claimed in claim 1, wherein said plurality of data registers include a plurality of sets of data registers for an upper byte and a lower byte, and said plurality of flag registers include a plurality of sets of flag registers for an upper byte and a lower byte.

* * * * *